Thal & Schlottmann.
Coffee-Pot.

N° 84020          Patented Nov. 10, 1868

Witnesses:
E. F. Kastenhuber
C. Wahlers

Inventor:
H. Thal
A. Schlottmann
pr
Von Santwood & Hauff
atts.

HERMANN THAL AND GUSTAV SCHLOTTMANN, OF NEW HAVEN, CONNECTICUT.

Letters Patent No. 84,020, dated November 10, 1868.

IMPROVEMENT IN COFFEE-POTS.

The Schedule referred to in these Letters Patent and making part of the same.

*To all whom it may concern:*

Be it known that we, HERMANN THAL and GUSTAV SCHLOTTMANN, both of New Haven, in the county of New Haven, in the State of Connecticut, have invented a new and improved Urn for Coffee, Tea, &c.; and we do hereby declare the following to be a full, clear, and exact description thereof, which will enable those skilled in the art to make and use the same, reference being had to the accompanying drawing, forming part of this specification, in which drawing—

Similar letters indicate corresponding parts.

Figure 1:
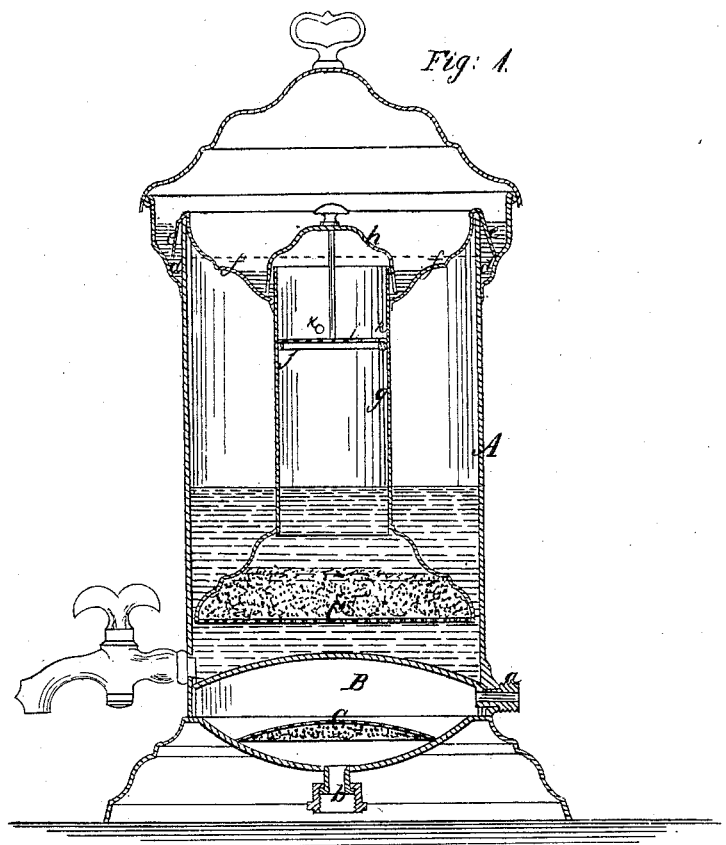
Figure 1 represents a vertical central section of this invention.
Figure 2:
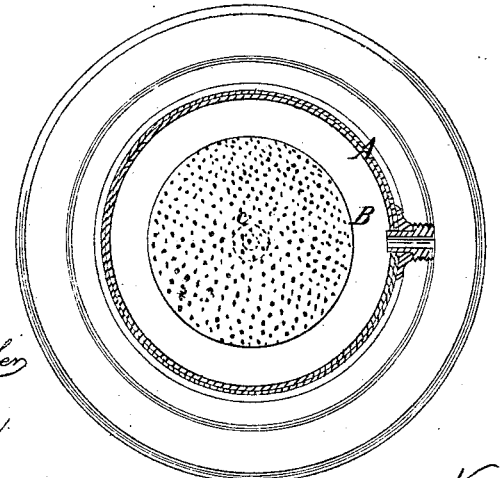
Figure 2 is a horizontal section thereof.

This invention relates to an urn for making coffee, tea, or other beverages of a similar nature, said urn being composed of a large strainer, secured to a narrow tubular neck, to which is secured a bell-shaped flanged mouth-piece, in combination with a vessel provided at its top edge with a gutter, the inner edge of which fits into the flange of the bell-shaped mouth-piece, while the edge of the tubular neck projects through the bell-shaped mouth-piece, and forms the seat for a cap, from which is suspended a perforated disk closely fitting into the neck, in such a manner that the strainer affords a large area on which the ground coffee, tea-leaves, or other material can be spread in a comparatively thin layer, while at the same time the perforated disk prevents the ground coffee or other material from boiling up into the mouth-piece, and the flanged mouth-piece and cap form water-joints, which effectually prevent the escape of the aroma. The cap also acts as a safety-valve, allowing the surplus pressure to escape automatically, and preventing accidents. The bottom of the vessel forms a steam-chamber, so that the liquid contained in said vessel can be heated by steam.

A represents a vessel, made of sheet-metal, or any other suitable material, in the form of a cylindrical column, or in any other desirable shape. The bottom of this vessel forms a steam-chamber, B, which is provided with a feed-pipe, $a$, and an exhaust-pipe, $b$. Over the exhaust-pipe extends a screen, $c$, which is perforated with small holes, so that the steam, on being admitted through the feed-pipe, is compelled to permeate the chamber B, and to expend the largest portion of its inherent heat, before it escapes through the exhaust-pipe.

The upper edge of the vessel A is surrounded by a gutter, $d$, the outer wall of which rises above its inner edge, so that if it (the gutter) fills with water to overflowing, the overflow will discharge into the interior of the vessel A.

The inner edge of the gutter $d$ fits into or under the flange $e$ of the bell-shaped mouth-piece $f$, which is secured to the tubular neck $g$, as clearly shown in the drawing. To the bottom end of the tubular neck is secured the strainer C, the diameter of which is nearly equal to the inner diameter of the vessel A, so that it affords an extensive area for the ground coffee or other material, and that said ground coffee or other material can be spread thereon, in a comparatively thin layer, allowing the hot water to permeate and extract the same to the best possible advantage.

The upper edge of the tubular neck $g$ extends beyond the bottom of the bell-shaped mouth-piece $f$, and it forms the seat for a cap, $h$; and from the centre of this cap is suspended a perforated disk, $i$, which, when the cap is in position, rests upon a shoulder, $j$, in the interior of the tubular neck.

When a sufficient quantity of water has been poured into the vessel A, the strainer C containing the ground coffee or other material is adjusted in position, and heat is applied. As soon as the vapors begin to rise, they come in contact with the inner surface of the cap and of the flanged mouth-piece, where the same condense, and a portion of the water resulting from the condensation accumulates in the gutter $d$, and at the bottom of the mouth-piece $f$, and as soon as this water rises high enough, it forms water-joints round the flange of the mouth-piece and round the cap, whereby the escape of the aroma is effectually prevented.

If desired, a quantity of water may be poured into the gutter and mouth-piece, before the heating-operation is commenced. In this case the air contained in the neck, between the level of the water and the cap, escapes through vent-holes $k$ into the vessel A.

When the liquid boils, the ground coffee or other material is liable to rise up in the neck, and the perforated disk $i$ prevents its being forced out over the top of said neck.

When the liquid boils violently, and the pressure in the vessel A rises beyond a certain point, the cap $h$ is lifted off from its seat, and the surplus pressure escapes automatically before any accident can occur.

If desired, the strainer C may be constructed of two perforated disks, one of which is secured to a cup fitting over the bottom end of the strainer C, so that the ground coffee or other material is confined between the two disks, and prevented from rising up into the neck $g$.

Having thus described our invention,

What we claim as new, and desire to secure by Letters Patent, is—

The arrangement and combination of the strainer C, tubular neck $g$, flanged mouth-piece $f$, gutter $d$, cap $h$, perforated disk $i$, and vessel A, all constructed and operating substantially as and for the purpose shown and described.

This specification signed by us, this 7th day of September, 1868.

H. THAL.
G. SCHLOTTMANN.

Witnesses:
W. HAUFF,
E. F. KASTENHUBER.